UNITED STATES PATENT OFFICE.

WILLIAM HENRY WETHERILL, OF PHILADELPHIA, PENNSYLVANIA.

MANUFACTURE OF WHITE LEAD.

SPECIFICATION forming part of Letters Patent No. 324,200, dated August 11, 1885.

Application filed February 16, 1885. (No specimens.)

*To all whom it may concern:*

Be it known that I, WILLIAM HENRY WETHERILL, of Philadelphia, in the county of Philadelphia and State of Pennsylvania, have invented certain new and useful Improvements in the Manufacture of White Lead, of which the following is a full, clear, and exact description.

This invention relates to the manufacture of white lead by what is known as the "Dutch" process, in which the corrosion of the lead is effected by placing buckles of lead in and over pots containing acetic acid and building up a "house" or stacks of the same on beds, one above the other, generally of spent tan-bark, with which manure is sometimes combined or each used separately. In using spent tan-bark or manure in such process there are serious objections, as respects tan-bark, owing to the unavoidable mixture with it of animal matter, which, becoming decomposed, emits an offensive and unwholesome odor, especially during the summer season, tending to injure the health of workmen, and, furthermore, gives out sulphur-ammonia gas, which, combining with the lead, produces black sulphide of lead, and thus injures the quality of the white lead. The spent tan-bark is, moreover, a heavy material to handle, thus making it a comparatively slow, costly, and laborious proceeding to build up and take down the house, and, owing to the peculiar structure of the bark, it but slowly generates the necessary heat, thereby further contributing to the cost of manufacturing white lead by the process herein referred to. Spent tan-bark, too, is comparatively expensive, and is constantly growing more so by the facility which tanners find in using it as fuel. The same objections apply to the use of manure or the mixture of tan-bark and manure.

My invention has mainly for its object the reduction or removal of these objections in the manufacture of white lead by the Dutch process; and my invention consists in the use as a heating agent in said process of the spent fibers of licorice-root (root of glycyrrhiza) fiber.

In carrying out my invention practically I provide a suitable floor, on which I spread a quantity of the fibers of the glycyrrhiza-root, and upon them arrange the pots containing the acetic acid and lead buckles. Boards are then placed over the pots, and upon them another layer of the glycyrrhiza is placed and another series of pots, as before, and I proceed in this manner until the house is completed, the general method of building up and taking down the house being the same as in the well-known "Dutch" process. No further description is therefore necessary.

Owing to the light weight of the glycyrrhiza, the workman is greatly facilitated in building up and taking down the house, much time and labor being thus saved over the use of bark or manure. Furthermore, owing to the fine and delicate nature of the fibers of the glycyrrhiza, the right quantity of oxygen from the air to produce the required heat is more quickly absorbed by the fibers, and the operation of conversion of the lead into the carbonate is therefore more rapidly accomplished than is possible by the use of tan-bark. This economy of time is a matter of great importance to the manufacturer, as the whole capital expended for the acid and lead is locked up until the operation of converting the lead is completed and the house taken down.

The spent glycyrrhiza fiber is at present comparatively worthless, so that as a result of my invention there will be a great saving of expense in the heating material. My invention, however, has other important advantages: Thus the glycyrrhiza is free from all unpleasant and unwholesome odors such as attach to spent tan-bark and manure, as hereinbefore mentioned.

The glycyrrhiza is free, too, from giving off sulphur-ammonia gas to combine with the lead and produce black sulphide of lead, thus improving the treatment of the lead and producing a purer and better article. The glycyrrhiza may have combined with it in some cases a portion of tan-bark or other suitable substances.

Having thus described my invention, what I claim as new, and desire to secure by Letters Patent, is—

The improvement in the manufacture of white lead by the Dutch process, which consists in replacing the tan-bark usually accumulated around the pots containing the acid and buckles of lead with a layer of ground or fibrous spent licorice-root.

WILLIAM HENRY WETHERILL.

Witnesses:
C. H. WATSON,
GRATTAN G. WILLIAMS.